United States Patent [19]
Kneissl et al.

[11] 4,452,692
[45] Jun. 5, 1984

[54] PROCESS FOR THE HYDROGENATION OF HEAVY OILS

[76] Inventors: Hannes Kneissl, Kurstr. 18, 8184 Gmund am Tegernsee; Klaus Schmid, Libauer Str. 27, 8000 München 81, both of Fed. Rep. of Germany

[21] Appl. No.: 375,980

[22] Filed: May 7, 1982

Related U.S. Application Data

[63] Continuation-in-part of Ser. No. 290,812, Aug. 3, 1981, abandoned.

[30] Foreign Application Priority Data

May 9, 1981 [DE] Fed. Rep. of Germany ....... 3118456

[51] Int. Cl.$^3$ .............................................. C10G 47/34
[52] U.S. Cl. .................................. 208/108; 208/8 R; 208/8 LE; 208/11 R; 208/11 LE
[58] Field of Search .................. 208/8 R, 8 LE, 11 R, 208/11 LE, 108, 110, 111, 112, 115

[56] References Cited
U.S. PATENT DOCUMENTS 4,388,170  6/1983  Schmid et al. ................ 208/11 LE Primary Examiner—Delbert E. Gantz
Assistant Examiner—A. Pal
Attorney, Agent, or Firm—Bell, Seltzer, Park & Gibson

[57] ABSTRACT

By the use of guanidinium compounds, more specially surface active guanidinium compounds—that is to say guanidinium compounds with an anionically active radical—by themselves or in connection with guanidinium carbonate as auxiliary reagents the hydrogenation of heavy oils may be promoted, there being a greater penetration of the hydrogen into the liquid phase and an activation of normally-used metal hydrogenation catalysts, this making possible a marked decrease in the least reaction pressure, which in the prior art is about 150 bar.

12 Claims, No Drawings

PROCESS FOR THE HYDROGENATION OF HEAVY OILS

SHORT ACCOUNT OF THE PRIOR ART

This application is a continuation-in-part of prior U.S. application Ser. No. 290,812, filed Aug. 3, 1981, now abandoned.

The present invention is with respect to the hydrogenation of heavy oils.

The wording "heavy oils" is used in connection with the present invention in the sense of high boiling point oil fractions, which are produced on processing petroleum or are present in natural deposits and presently are being worked or mined on an ever increasing scale the world over. Furthermore heavy oils may be produced from tar sand and/or oil shale. Generally speaking, the heavy oils of the sort presently coming into question are solid or highly viscous at normal temperature but become melted at tempertures over about 100° C. and may then be flowed and pumped.

Furthermore of late such oils as used in the present invention have been named "non-conventional oils".

ACCOUNT OF THE INVENTION

One object of the present invention is that of promoting the chemical reaction between the hydrogen and the heavy oil as a high molecular hydrocarbon mixture by the use of auxiliary reagents in the hydrogenation of heavy oils.

For effecting this object, and further purposes, in the present invention the suggestion is the use of guanidinium compounds as auxiliary reagents, that is to say the use of only one guanidinium compound by itself or in connection with other different guanidinium compounds.

The wording "auxiliary reagents" is used in connection with the present invention to make it clear that such compounds, unlike catalysts, are used up as the process goes on, that is to say in the physical and/or chemical reaction on which the process is based. Because, however, the auxiliary reagents are only used in catalytic amounts and furthermore have catalytic effects, they have furthermore been named "throw-away catalysts".

The present invention is with respect to a further development of the invention disclosed in U.S. patent application Ser. No. 290,812 (**) whose disclosures are to be taken to be part of the invention or subject matter of the present application. While in the said earlier applications the most important point was the hydrogenation of, more specially, coal, and of high molecular weight hydrocarbon mixture in general, the present invention is with respect to conversion of heavy oil by hydrogenation.
**PCT/EP 80/00140

From the point of view of the present invention, it may be said that high molecular weight hydrocarbon mixture in a form of coal is unlike a high molecular weight hydrocarbon mixture in the form of heavy oil in respect of the different levels of phenol and, in the other case, thiophenol of the two materials which are, generically speaking, like each other. Further observations on this special difference will be made later on.

The hydrogenation of heavy oil, that is to say the chemical reaction of a high molecular weight hydrocarbon mixture with molecular hydrogen is generally dependent—but for the question of acceleration by metal-containing hydrogenation catalysts—on two factors, that is to say:

(a) the partial pressure of the hydrogenation dissolved in the liquid phase, such partial pressure increasing with an increase in the outside reaction pressure used, and (b) the cracking properties of the hydrocarbon mixture, that is to say the number of broken C—C bonds within the macromolecular substrate, such cracking property or crackability increasing with an increase in the outside reaction temperature used.

However with respect to the way in which they are dependent on pressure and temperature such factors undergo opposite changes.

The discovery has now been made that the guanidinium compounds to be used in the invention as auxiliary reagents make it possible for the pressure and temperature to be lowered in the hydrogenation reaction.

Further work on the invention has made it clear that guanidinium compounds with a surface active property—these being all guanidinium compounds with an anion active radical which is a salt of a carboxylic acid and more specially a fatty acid, or is a phenolic, sulfonic and/or polyalcholic anion radical—are responsible for the penetration of the hydrogen into the liquid phase being stepped up because such guanidinium compounds have a very highly surface active effect.

Furthermore the emulsifying guanidinium compounds make possible a more active use of the sulfide-containing metal-catalysts, normally used, the same speeding up the hydrogenation reaction. On these lines it may be said that guanidinium compounds have a cocatalytic effect, that is to say they make it possible for the amount of the metal hydrogenation catalysts used (in an amount which has to be equal to up to 5% of the weight of the heavy oil to be processed, with continuous addition of the compound without any chance of using it again) to be greatly decreased.

It is not only the increased penetration of the hydrogen into the liquid phase but furthermore the activation of the metal hydrogenation catalysts by reason of the use of guanidinium compounds as auxiliary reagents and the hydrogenation of heavy oils which make possible a marked decrease in the least reaction temperature, otherwise used in the prior art, of about 150 bar.

The guanidinium compounds used in the present invention are decomposed at a raised temperature and changed into highly reactive decomposition products, which for their part are responsible, in a way very much to be desired, for breaking down C—C bonds within the high molecular weight hydrocarbon mixture in the form of heavy oil. The cracking of the heavy oil, which otherwise only gets going at a temperature over 400° C., starts at a temperature as low as 200° C. so that the temperature level necessary for the hydrogenation reaction may be low.

A number of different preferred forms of the guanidinium compounds to be used in the invention are given in the dependent claims.

For the acceleration of the cracking reaction guanidinium carbonate gives specially useful effects, and is better in this respect than guanidinium chloride, sulfate or nitrate, which may be used, because guanidinium carbonate has the property of stopping corrosion, causing less environmental troubles and being better with respect to the control of its decomposition.

The overall amounts used in each case of guanidinium compounds or compounds may be up to 10% or, more specially, between 0.1 and 3%, of the weight of the starting material, that is to say of the heavy oils.

The solibility of guanidinium compounds in oil as a non-polar medium is low. On the other hand guanidinium compounds with an anion active radical are very good emulsifiers so that they have excellent penetration properties into the melted heavy oil, which is to undergo hydrogenation. What is more, guanidinium emulsifiers have the effect of suspending guanidinium carbonate, which as such is sparingly soluble, in melted heavy oil. For this reason the effect, more specially produced with guanidinium carbonate over 200° C., of increasing the number of C—C bond breaks in the substrate to be hydrogenated may be made use of because of an in situ decomposition.

After different sorts of guanidinium emulsifiers in existence, guanidinium stearate, oleate and palmitate are specially important inasfar as they are simple to get by using guanidinium carbonate and the fatty acid in question or (waste) fatty acid mixture. A further useful way of producing guanidinium emulsifiers in the form of guanidinium phenolates is to be seen in the reaction of guanidinium carbonate with phenols in the form of (for example, tar or raw far acids.

On using guanidinium carbonate as an auxiliary reagent for the hydrogenation of coal a further useful effect is to be seen in the generally high level of phenol in bright burning coals, such coals being mainly used for hydrogenation and having an O-level of about 9%, for intermediate production of guanidinium phenolates with an emulsifying effect. This is responsible for the difference, which we saw earlier, between coal and heavy oil and which has to be taken into account in the present invention. The addition by itself of guanidinium carbonate is not enough as a general rule in case of the hydrogenation of heavy oil, although in certain special cases in which heavy oils have a high acidity such guanidinium carbonate addition may be great enough. However it is furthermore not necessary for the addition to be made of guanidinium stearate as such as an auxiliary reagent and in fact, from the price angle, it is better for the mixture if addition (made to the hydrogenation reaction) is of guanidinium carbonate and fatty acids, such mixture then forming guanidinium fatty acid salts and letting off carbon dioxide.

As a general point it may be said that for the different guanidinium compounds to be used in the present invention, such compounds do not have to be used in righton stoichometric ratios and to be run into the reaction mixture in question in hard-and-fast weight ratios. In point of fact, the makeup and the amount of the best formula in a special case may be dependent on the profit and price point of view.

The economic value of the invention produced by the use of guanidinium compounds in the hydrogenation of heavy oil is more importantly dependent on the fact that the working temperature and pressure of the invention to be kept to are very much lower than the reaction conditions of at least 420° C. and 150 bar in the prior art, so that plant and running costs of the hydrogenation process may be decreased.

A more specially profitable form of the heavy oil hydrogenation process is one in which in place of sulfide containing metal hydrogenation catalysts which have to be used at a rate of 5% of the weight of the heavy oil process, special coals, having the property of catalysing hydrogenation reactions, may be used as hydrogenation catalysts, and for getting a better activation thereof guanidinium compounds are used as cocatalysts.

This makeup of the catalyst is responsible for the important useful effect that the high-cost disposal of metal catalysts produced necessarily as a by-product in large amounts at tthe end of a process in the prior art is no longer necessary, because the coal catalyst is to a high degree hydrogenated as well and the small amounts of the coal catalysts which are not hydrogenated may be used, together with solid residues produced in heavy oil hydrogenation, may be put to some further use.

We claim:

1. In a process for the hydrogenation of a normally solid or highly viscous heavy oil produced from petroleum, tar sand, and/or shale in which the heavy oil is heated at a pressure and elevated temperature sufficient to effect a chemical reation of the heavy oil with hydrogen, the improvement which comprises heating said heavy oil in the presence of at least one guanidinium compound as an auxiliary reagent.

2. The process as claimed in claim 1 wherein said guanidinium compound is used in an overall amount of up to 10% of the weight of the heavy oil used as a starting material.

3. The process as claimed in claim 2 wherein said guanidinium compound is used in an amount equal to 0.1 to 3% of the weight of the heavy oil used as a starting material.

4. The process as claimed in claim 1 or claim 2 wherein said guanidinium compound has an anion-active radical.

5. The process as claimed in claim 1 or claim 2 wherein said guanidinium compound used with an anion-active radical is selected from the group: guanidinium stearate, guanidinium palmitate, guanidinium oleate.

6. The process as claimed in claim 1 or claim 2 wherein said guanidinium compound is guanidinium carbonate.

7. The process as claimed in claim 1 or claim 2 wherein said guanidinium compound is selected from the group: a guanidinium carboxylate, guanidinium sulfonate, guanidinium phenolate, a guanidinium polyalcoholate, said selected guanidinium compound being used together with guanidinium carbonate.

8. The process as claimed in claim 1 or claim 2 in which guanidinium carbonate is used together with other guanidinium compounds with a weight ratio between the guanidinium compound and guanidinium carbonate between 0.3:1 and 3:1.

9. The process as claimed in claim 1 or claim 2 wherein guanidinium carbonate is used mixed with at least one waste fatty acid in a weight ratio of the guanidinium carbonate to a fatty acid of about 1:1.

10. The process as claimed in claim 1 or claim 2 wherein guanidinium carbonate is used mixed with at least one raw tar acid in a weight ratio of the guanidinium carbonate to a raw tar acid of about 1:1.

11. The process as claimed in claim 1 or claim 2 wherein guanidinium carbonate is used mixed with finely milled bright burning coal in a weight ratio of the guanidinium carbonate to a finely milled bright burning coal of about 1:10.

12. The process as claimed in claim 1 or claim 2 wherein said guanidinium compound is selected from the group: a guanidinium carboxylate, guanidinium sulfonate, guanidinium phenolate, a guanidinium polyalcoholate, said selected guanidinium compound being used together with guanidinium carbonate, the same being mixed with finely milled bright burning coal having a hydrogenation catalytic effect, in a weight ratio of guanidinium compound to coal between 0.1:10 and 1:10, the amounts of the mixed materials being equal to up to 30% of the weight of the heavy oil used as a starting material.

* * * * *

UNITED STATES PATENT AND TRADEMARK OFFICE
CERTIFICATE OF CORRECTION

PATENT NO. : 4,452,692

DATED : June 5, 1984

INVENTOR(S) : Hannes Kneissl and Klaus Schmid

It is certified that error appears in the above-identified patent and that said Letters Patent are hereby corrected as shown below:

Column 1, Line 19, the word "tempertures" should be -- temperatures --.

Column 1, Line 28, after the word "molecular" insert the word -- weight --.

Column 2, Line 3, the word "hydrogenation" should be -- hydrogen --.

Column 4, Line 11, the word "tthe" should be -- the --.

Signed and Sealed this

Twenty-fifth Day of September 1984

[SEAL]

Attest:

GERALD J. MOSSINGHOFF

Attesting Officer

Commissioner of Patents and Trademarks